C. E. F. AHLM.
DYNAMO ELECTRIC MACHINE.
APPLICATION FILED MAY 16, 1910.

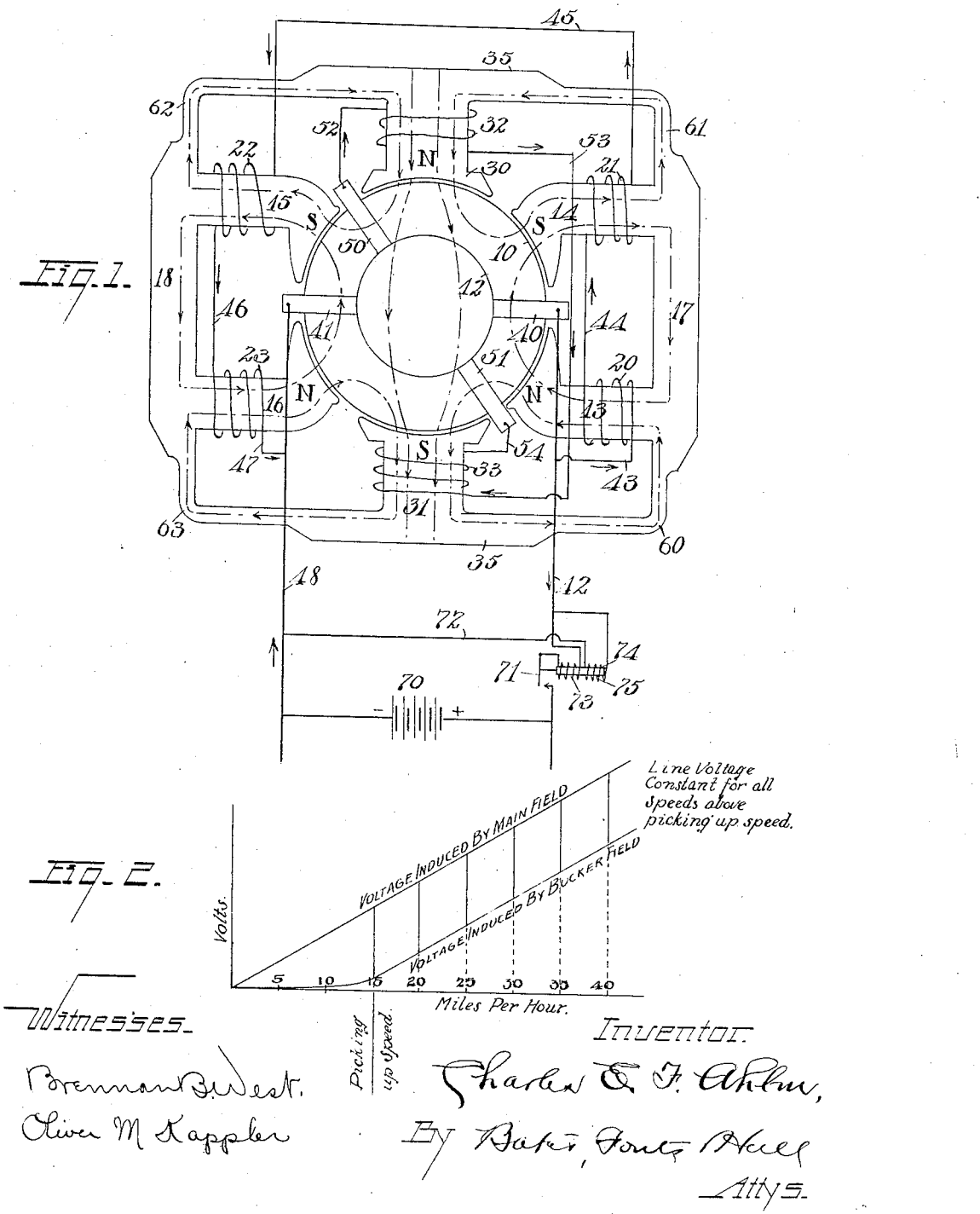

1,132,145.

Patented Mar. 16, 1915.
2 SHEETS—SHEET 2.

Witnesses:
Brennan B. West.
Oliver M. Kappler.

Inventor
Charles E. F. Ahlm,
By Baker, Jones & Hull,
Attys.

UNITED STATES PATENT OFFICE.

CHARLES E. F. AHLM, OF CLEVELAND, OHIO, ASSIGNOR TO MORRIS S. TOWSON, OF CLEVELAND, OHIO.

DYNAMO-ELECTRIC MACHINE.

1,132,145.  Specification of Letters Patent.  Patented Mar. 16, 1915.

Application filed May 16, 1910. Serial No. 561,609.

*To all whom it may concern:*

Be it known that I, CHARLES E. F. AHLM, a citizen of the United States, residing at Cleveland, in the county of Cuyahoga and State of Ohio, have invented a certain new and useful Improvement in Dynamo-Electric Machines, of which the following is a full, clear, and exact description, reference being had to the accompanying drawings.

My application No. 543,736, filed February 14th, 1910, shows and describes a dynamo electric machine having interposed fields acting on the same armature, and operating one to counteract or buck the other, the result being that a constant potential may be given with variable speed, or variable speed with the constant potential, according to whether the machine is a generator or motor. In that application the direction of the lines of force in the counteractive or bucker field is determined by means of a teaser winding thereon in series with the main field. Such teaser winding is effective in producing the desired result. I find, however, that under certain conditions, it is possible to do without the teaser winding and obtain the proper directive action for the lines of force in the bucker field by means of magnetic leakage from the main field. This feature of magnetic leakage forms the basis of the present application. The present application is covered by claims in the application referred to, and may be embodied in a structure very similar thereto. Accordingly, I claim herein only the feature peculiar to this application, namely, the directing of lines of force by means of magnetic leakage.

Figure 3:
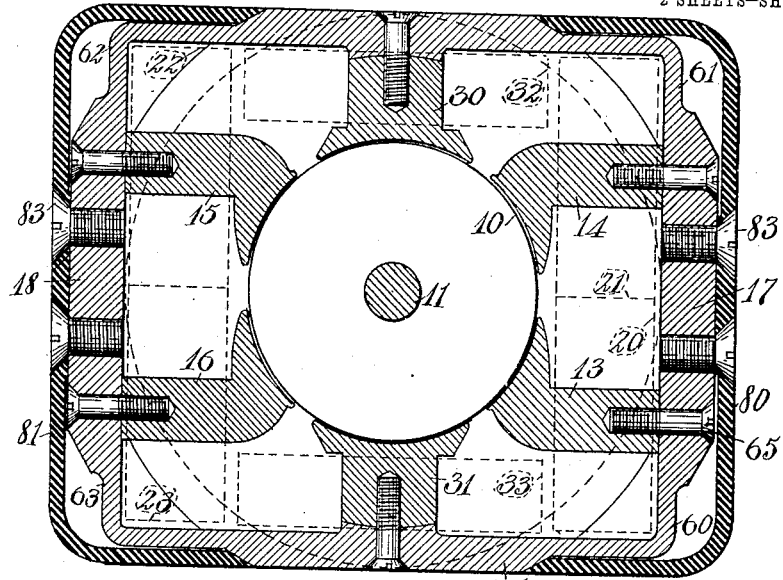
Figure 4:
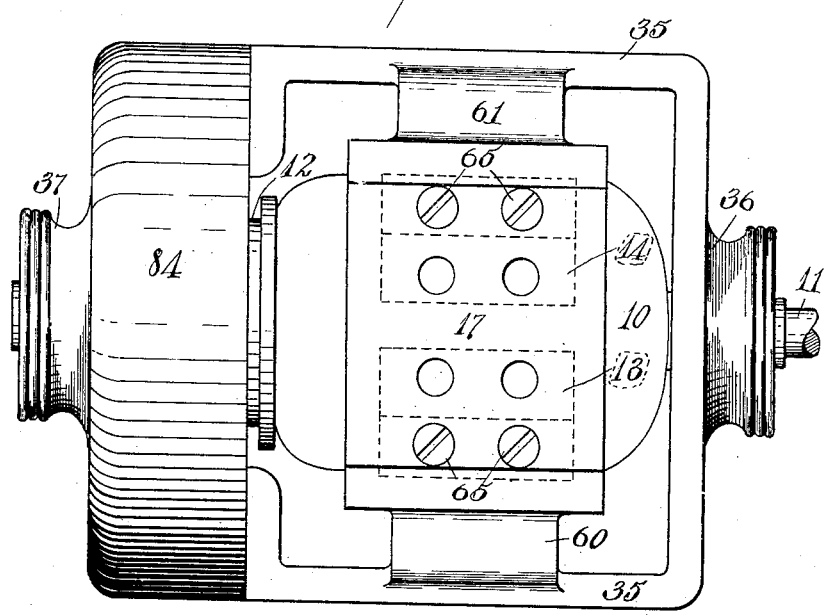

In the drawings, Figure 1 is a diagram illustrating my invention; Fig. 2 is a diagram illustrating the electric results produced by my machine; Fig. 3 is a transverse vertical section of the machine; and Fig. 4 is a side elevation thereof.

Referring to the drawings, 10 represents the armature on a suitable shaft 11 and having a commutator 12. Two main field magnets are shown operating on this armature having the pole pieces 13, 14, 15 and 16. The poles 13 and 14 are connected by a magnetic cross member 17, and the poles 15 and 16 by a corresponding member 18.

The windings on the respective main field cores are designated 20, 21, 22 and 23. The windings are in such direction that the polarity of the main field poles 14 and 15 are the same, and the poles 13 and 16 the same. As shown in the diagram, 14 and 15 may be south poles and 13 and 16 north poles. Intermediate of the two south poles of the main field is a north pole bucker field core, designated 30, and intermediate of the main field north poles is a south pole bucker field core 31. The windings of these cores are designated 32 and 33 respectively. The two poles of the bucker field shown are magnetically connected by the continuous ring 35 which extends endwise over the machine and constitutes the main frame of the machine. This main frame may be arranged to support the armature shaft preferably through the intermediacy of removable central non-magnetic supporting members 36 and 37.

40 and 41 indicate commutator brushes related to the main field, and 50 and 51 commutator brushes related to the bucker field. The main field has a shunt winding which may, or may not, be supplemented by a series winding. Such series winding is omitted in the diagram for clearness of illustration, as it will be well understood. As shown, one of the main lines 42 leads from the brush 40. From this brush, or from this main lead, a connection 43 leads to the main field coil 20, thence via the connection 44 to the main field coil 21, thence via the connection 45 to the main field coil 22, thence via connection 46 to the main field coil 23, and thence via connection 47 to the return main line 48 or directly to the main commutator brush 41. The electric circuit of the bucker field starts from the brush 50 via the line 52 through the line 32, and via the line 53 through the coil 33, via the line 54 to the brush 51, this bucker field circuit being accordingly entirely local. The armature, it will be understood, is wound on the closed circuit or Gramme ring principle, as if for a two-pole machine.

The arrangement of poles and windings above described is substantially that of my prior application referred to, and is covered therein. As stated, the novelty of the present invention consists in obtaining the proper directive action of the bucker field by magnetic leakage from the main field. This I accomplish in a very simple manner by making magnetic connectors from the connecting plates 17 and 18 of the main magnets to the ring 35 of the bucker field magnet. These connectors are designated 60, 61, 62 and 63 and they consist of comparatively thin and narrow portions of magnetic material connecting the back plates 17 and 18 referred to with the frame ring 35. The frame ring, the back plates 17 and 18 and the connecting plates referred to, are preferably all cast in one integral piece. These magnetic connections 60, 61, etc., besides carrying leakage lines of force from the main field to the bucker field, also form a physical support for the main magnet cores. The main magnet cores, as shown, are secured to their back plates by suitable screws 65. The connecting portions of the frame 60, 61, etc., are bent like elbows to allow convenient space for the main field windings.

As shown by the conventional arrows in Fig. 1, it will be seen that the main magnetic circuit of the main field poles is between the poles and through the back plates 17 or 18, while the principal magnetic circuit of the bucker field is between the poles and around the frame ring 35 and, that, in addition to this there is a leakage magnetic circuit from each main field pole piece through the corresponding connecting plate 60, etc., through the bucker field pole, and across the gap to the main field pole. This leakage circuit, it will be seen, will give a definite direction to the magnetic flux of the bucker field poles which is of opposite polarity to the adjacent pole of the main field. This is a very important point, as the operation of the machine to be hereinafter described depends on the bucker field poles having a polarity opposite to that of the adjacent main field poles.

My machine is well adapted for use as a generator for lighting vehicles in connection with a battery system where the generator is driven by the movement of the vehicle and varies with the speed thereof, as for example, where the armature is driven by a car axle. In such an installation it is desirable to have an automatic switch closing the circuit when the proper minimum train speed has been reached, and opening the circuit if the speed drops below such minimum. This is illustrated in Fig. 1: As shown in this figure, 70 represents a battery in a shunt across the main leads 42 and 48.

71 represents an automatic switch adapted to control the main line and having a compound winding; one winding 75 of this switch being of very high resistance and in a shunt 72 across the lines 48 and 42, and the other winding 73 being of few turns and in series in one of the leads, as the lead 42. Both windings are shown as coiling about the core in the same direction. 74 indicates an armature under the influence of this compound winding 73 and 75 which is adapted, when attracted, to close the break in the line 42 between the switch and battery.

Let us assume that the machine is a generator and that the armature 10 is connected with an axle of the car, for example, and that the switch 21 is wound to pick up its armature when a certain current is generated, say that resulting from a train speed of fifteen miles per hour. Now as the train starts, the armature rotates slowly and the main line is open at the switch 74 so that the voltage builds up on the shunt 72 through the winding 75 of the switch. During this period before the switch picks up, the main field and the bucker field (due to the directive action of the leakage magnetic circuit) are operating to give currents of such direction as to cause the successive poles to have opposite signs. The actual direction of these currents depends on the residual magnetism, but their relative direction is fixed. The bucker field current (due to the small amount of magnetic leakage through the connectors 60, etc.,) is so small in the early stage of rotation as to be negligible. When the speed reaches the predetermined amount the switch picks up its armature by reason of the energization of its shunt winding, thereby throwing the battery on the line. This action is the same, irrespective of the direction from the generator, but the resulting action varies with the direction of the current. Suppose first the initial current from the generator, when the switch picks up, is in the right direction for charging the battery; then the current will continue to flow in the same direction in the shunt of the switch and also in the shunt of the generator and will flow through the series winding of the switch and the battery. The switch, accordingly, will be held closed by both its shunt and series windings, and the original polarity of the generator will be maintained. In this operation, if the lamps are in circuit, the battery is either floating on the line or is being charged, according to whether the battery voltage is equal to or less than the generator voltage. If the lamps are not in circuit, the generator current is effective in charging the battery until its voltage is substantially equal to that of the generator, after which the battery floats on the line and there is practically no action, though the armature continues to rotate. Suppose, however, when the switch picks up its armature, by reason of the speed reaching a predetermined amount, that the initial current flowing from the generator through the shunt coil of the switch is in the wrong direction to charge the battery; then, under this condition the current from the generator flowing through the battery in the wrong direction for charging it flows through the series winding of the switch in the direction to assist the current in the shunt winding, thereby still holding the switch closed. Now, for the reason that the generator voltage is in the wrong direction for charging, it is in the same direction as the battery voltage, and, added to the battery voltage, will cause a short circuit of the armature. This short circuit, however, is only momentary for the following two reasons, namely; first, the heavy short circuit current will produce a nulling effect on the excitation of the generator field; second, the current flowing, though being in a direction opposite to the charging direction, will nevertheless flow through the generator shunt in the right direction—that is a direction for excitation which will cause the generator current to flow in the right direction for charging. These two effects combined will cause the generator current, first to become zero, at which moment the switch will open, but before it opens, the battery current acting on the generator shunt has produced a reverse polarity, so that, immediately after the switch opens it will close again, with the current flowing in the right direction, but thereafter the switch will stay closed and the current will continue in the right direction for charging. Now, as the speed increases, the E. M. F. induced in the armature conductors by the main field rises proportional to the speed, inasmuch as this field has a constant excitation (initially, at least, due to the battery), while the E. M. F. induced in the armature conductors by the local bucker field rises in double proportion to the speed, being connected solely in series with the armature and thus having an excitation varying with the speed, (the constant leakage excitation being negligible) and having in addition its own voltage due to the speed. As the effects of these two fields are opposite, the main line voltage, given out by the machine, is due to their difference, which is a constant irrespective of the speed.

The action described is illustrated in the diagram, Fig. 2, wherein the ordinates represent voltages, and the abscissas, speeds. The voltage induced by the main field increases in a straight line, and the voltage induced by the bucker field in a substantially straight line after the picking up point, so that the resultant line voltage is the difference between the two, which, after the picking up point, is a constant. This insures a constant potential for charging the battery, as well as proper current to the lamps to illuminate them without danger of burning them out. In Fig. 2 both the main field voltage and the bucker field voltage are shown above the base line and read upwardly from it, as both these voltages are positive (though acting in opposition to each other), the resulting voltage being the difference between them.

With the generator connected as described, when the battery is fully charged the E. M. F. of the battery and generator are equal and no current flows in the series winding 73 of the switch. Hence, the switch does not open but the battery floats on the line until the speed of the generator drops so as to start the current from the battery in the direction toward the generator.

It will be seen that the brushes both for the main field and the bucker field stand in sharply defined neutral positions, insuring excellent commutation. Of course the actual position relative to the poles may be anything depending on the connections to the commutator, but it is convenient to show them in the diagram in the neutral position between the poles.

It will be understood that the selection of a two-pole machine, as shown, is simply illustrative, and that the invention may be amplified to a multi-polar machine to any extent desired, so long as the relative arrangement of alternate poles is maintained, there being two main field poles between the adjacent poles of the bucker field.

The bucker field is always in action, being in a circuit of its own, but for very low speeds the voltage induced by it is so low that its opposition to the voltage induced by the main field is negligible; but after a certain critical speed has been attained the voltage induced by the bucker field is not only sufficient to effectively oppose the voltage induced by the main field but, like that of the main field, rises proportionately to the speed. The switch is preferably wound to pick up its armature at this critical speed.

The speed at which the bucker field comes into the effective action described may however be varied as desired, by varying the winding of the switch 71 and the bucker field winding. The higher the speed required for the switch to pick up its armature (i. e. the later the picking up point in Fig. 3), the greater the difference between the main field voltage and the bucker field voltage, and the greater the output. This output may also be increased by properly proportioning the relative strength of the different windings. Much of the particular construction of the mechanical parts of the machine shown is covered in my prior application referred to. The construction and location of the connecting portions 60, etc., shown herein, is convenient, and is claimed in this application in addition to the broad claims covering any leakage connector for the magnetic lines. As shown, in the present embodiment the main magnets are carried positively by the main frame and independent of the side casings. Two side casings are shown at 80 and 81 which may consist of aluminum, or other non-magnetic plates, held to the plates 17 and 18 by screws 83. A suitable annular casing 84 may be placed over the commutator brushes, not shown.

Having thus described my invention, what I claim is:—

1. In a dynamo electric machine, the combination, with the armature, of means for producing a main field and a counteractive field, means for causing the counteractive field to have the direction of its magnetic flux initially determined by magnetic leakage from the main field.

2. In a dynamo electric machine, the combination, with an armature, of means for producing a main field and a counteractive field acting thereon, such fields presenting alternately magnetic poles of opposite sign to the armature, and means for initially exciting the counteractive field by magnetic leakage from the main field.

3. In a dynamo electric machine, the combination, with a single armature, of means for producing a main field and a counteractive field both acting thereon, and means for causing magnetic lines of force to pass from the main field to the counteractive field determining the polarity of the counteractive field.

4. In a dynamo electric machine, the combination, with an armature, of a main magnet field and counteractive field magnet both acting thereon, a local winding for the counteractive field magnet, and means for establishing a magnetic circuit from the main field through the counteractive field to determine the polarity of the latter.

5. In a dynamo electric machine, the combination, with an armature, of cores and windings producing a counteractive field and a main field both acting on the armature, the main field producer having a pair of pole pieces for each pole piece of the counteractive field producer, the pole pieces for the two fields being arranged to be of successively opposite polarity, and means for establishing a magnetic circuit from one main field pole piece through the adjacent counteractive field pole piece.

6. In a dynamo electric machine, the combination, with an armature, of means for producing a counteractive field and an interposed main field, the two fields presenting to the armature pole pieces of successively opposite polarity, and magnetic connectors between the counteractive field pole pieces and the adjacent main field pole pieces.

7. In a dynamo electric machine, the combination, with an armature, of a main field magnet, of a counteractive field magnet, and means whereby the counteractive field has its polarity determined by main field magnetic leakage.

8. In a dynamo electric machine, the combination, with an armature, of means for producing a main field, a counteractive field magnet, commutator brushes, a local circuit winding for the counteractive field magnet from said commutator brushes, and means for establishing a magnetic flux from the main field cores through the counteractive field cores.

9. In a dynamo electric machine, the combination, with an armature, of counteractive field pole pieces, a ring of magnetic material carrying the same, related main field pole pieces, windings therefor, magnetic connections between the main field pole pieces and said ring, and a local winding for the counteractive field pole pieces, independent of the windings first mentioned.

10. In a dynamo electric machine, the combination, with the armature, of counteractive field pole pieces, a ring of magnetic material carrying the same and extending over the ends of the armature, main field horse-shoe magnets on opposite sides of the armature, magnetic material connecting such horse-shoe magnets with the ring, two sets of commutator brushes and windings for the main field magnets connected with one set, and a local winding for the counteractive field pole pieces connected with the other set.

11. In a dynamo electric machine, the combination, with the armature, of a ring extending over the ends of the armature, pole pieces carried by said ring, other pole pieces on opposite sides of the armature, magnetic connections from said other pole pieces to the ring, such connections being of cross section reduced from that of the main magnetic path between the first mentioned pole pieces to restrict the magnetic flow between the two sets of pole pieces.

12. In a dynamo electric machine, the combination, with an armature, of a field frame extending over the ends of the armature and also extending around the sides of the armature and made in one integral casting, counteractive field pole pieces carried by said frame, main field pole pieces carried by the side extensions, the connecting portion of the frame between the main field pole pieces and the counteractive field pole pieces being of comparatively small cross section with reference to that connecting together the respective pole pieces of the main magnets to restrict the magnetic flux.

13. In a dynamo electric machine, the combination, with an armature, of a counteractive field magnet having two pole pieces acting on the armature, two main field magnets, each having two pole pieces acting on the armature, each main field magnet having both its pole pieces adjacent to each other and located between the two pole pieces of the counteractive field magnet, main windings for the main field magnets, a pair of commutator brushes with which said windings connect, local windings for the counteractive field pole pieces, a pair of commutator brushes forming terminals of said local windings, a commutator connected with the armature and coöperating with both sets of brushes, and a magnetic connection between the main field magnets and the counteractive field magnet, which magnetic connection is of smaller cross section than that connecting together the individual pole pieces of either main magnet.

In testimony whereof, I hereunto affix my signature in the presence of two witnesses.

CHARLES E. F. AHLM.

Witnesses:
J. B. HULL,
A. J. HUDSON.